US008650113B2

(12) United States Patent
Jacobs (10) Patent No.: US 8,650,113 B2
(45) Date of Patent: Feb. 11, 2014

(54) IDENTIFICATION OF ACCOUNTS THAT ARE TOO PROFITABLE OR TOO LOSSY

(75) Inventor: Martin Jacobs, Teaneck, NJ (US)

(73) Assignee: Chicago Mercantile Exchange Inc., Chicago, IL (US)

(*) Notice: Subject to any disclaimer, the term of this patent is extended or adjusted under 35 U.S.C. 154(b) by 143 days.

(21) Appl. No.: 13/284,372

(22) Filed: Oct. 28, 2011

(65) Prior Publication Data

US 2013/0110696 A1 May 2, 2013

(51) Int. Cl.
*G06Q 40/00* (2012.01)
(52) U.S. Cl.
USPC ............... 705/37; 705/7.36; 705/30; 705/35; 705/36 R; 705/38
(58) Field of Classification Search
None
See application file for complete search history.

(56) References Cited

U.S. PATENT DOCUMENTS

| | | | |
|---|---|---|---|
| 2003/0040955 A1* | 2/2003 | Anaya et al. | 705/10 |
| 2003/0158798 A1* | 8/2003 | Green | 705/30 |
| 2003/0236738 A1 | 12/2003 | Lange et al. | |
| 2004/0088722 A1 | 5/2004 | Peker | |
| 2005/0004862 A1* | 1/2005 | Kirkland et al. | 705/38 |
| 2005/0044026 A1 | 2/2005 | Leistner | |
| 2006/0036525 A1* | 2/2006 | Ramos et al. | 705/35 |
| 2011/0082814 A1* | 4/2011 | Chiulli et al. | 705/36 R |
| 2012/0330814 A1* | 12/2012 | Doornebos et al. | 705/37 |

FOREIGN PATENT DOCUMENTS

WO WO 01/50385 * 7/2001 ............. G06F 17/60

OTHER PUBLICATIONS

Bergstra, Jan A. et al. "Philosophy of Money and Finance." Philosophy of Finance. 14 pages. Webpage Available at: <http://www.phil.uu.nl/.about.janb/phloofin/top.html>.*
PCT Search Report and Written Opinion dated Jun. 6, 2012, PCT/US12/23581, filed Feb. 2, 2012.
Kyle and Viswanathan, "How to Define Illegal Price Manipulation," *University of Maryland, Robert H. Smith School of Business*, Jan. 14, 2008.

* cited by examiner

*Primary Examiner* — Robert R Niquette
(74) *Attorney, Agent, or Firm* — Brinks Gilson & Lione (57) ABSTRACT

An electronic surveillance system or method identifies potentially suspect trading activities by determining when day trading accounts are too consistently profitable or too consistently unprofitable (lossy). The electronic surveillance system examines specific futures commodities or other securities over a specified time period (e.g., daily). Accounts that are too consistently profitable or too consistently unprofitable are flagged by the system. In addition, the system may report when a trading account experiences statistically unusually large gains or losses per contract traded and gains or losses or a high percentage of time periods. The day to day profits or losses are displayed to a user in a graphical format that expresses the profit or loss trends intuitively before additional analysis of charts or numbers. The system may also perform the analysis for pairs of accounts where trades opposite to one another of the pair are unusually consistently profitable or unusually consistently lossy.

20 Claims, 7 Drawing Sheets

```
A ─── pp  p        ppp              p         p p       ppp    pp
B ─── 11111111p1111 11p11111111p 1111111 1 111111
C ─── 1111 1 11p1p1 11p11111111p 1 1111   1111111
D ─── 111111p1p111p111 111 111 p 1111p111 111111
E ─── pppppppppppplppppppppppppp1 ppplppplppppp1
F ─── 111 1111111p1 11 11pp1111p 1111 111 1 1111
G ─── 1111111111pp11111111p11 11111111pp11111
H ─── ppppppppppplppppppppppplppp 1p p1ppppppppp
I ─── p pp pppppp p1pp ppppppp p pppl ppppppppppp
J ───         11 1    1  1 1p           11    1  11
K ─── p  p   ppppl  pp  ppplpp   pppp   p  pplppppp
L ───           11  1      1 1 1    11         11
M ─── p 1  11  11        1     111       1    1
N ─── pp  ppppplpppppppp1    p p p  pp    pppp p pp
O ─── 1111p 1111   11              1     p        1
P ─── 11111      11 1111111  1p11
Q ─── ppppp    pppppp    ppppplpppppplppppppppppppp
R ─── pppppppppppppppppppppppppppppppppppplpppppp
S ─── 1111 1 1 1  11 p 11       11    1    111
T ─── pppppp pp ppplpppp  p 1   1pppp     ppp    pp
U ─── 1ppppppppppp   pp1pppp  pp11ppppppppppp1p pppp
```

FIG. 2

| 304 | 306 | 308 | 310 |
|---|---|---|---|
| A | 100% | 510 | $ 477 |
| B | 92% | 5416 | $ -574 |
| C | 88% | 347 | $ -556 |
| D | 86% | 870 | $ -406 |
| E | 87% | 45163 | $ 167 |
| F | 88% | 4491 | $ -694 |
| G | 87% | 936 | $ -470 |
| H | 90% | 420 | $ 305 |
| I | 94% | 889 | $ 372 |
| J | 91% | 539 | $ -439 |

IDENTIFICATION OF ACCOUNTS THAT ARE TOO PROFITABLE OR TOO LOSSY

TECHNICAL FIELD

The following disclosure relates to software, systems and methods for surveillance of trading activities in an exchange or similar arrangement.

BACKGROUND

No trader always profits or always loses money. For every account that profits on a trade, another account, or combination of accounts has suffered on the trade. Statistically, as the length of the time period examined decreases, accounts should have some profitable time periods and some unprofitable or lossy time periods.

However, in practice, some accounts have no or very few profitable time periods and others have no or very few lossy time periods. This unusual consistency may result from a variety of mischievous scenarios, including, for example the scenario when two accounts collude to use the trading system as a vehicle for under the radar money transfer. Current trading systems may allow the activity in these accounts to continue undetected.

DETAILED DESCRIPTION

The following embodiments identify trading activity that is too consistently profitable or too consistently lossy. Trading activity that is too consistently profitable or too consistently lossy may be caused through a variety of schemes. The schemes include money passing, front running, manipulative trading, contract skimming, or other examples.

Front running involves practices such as when a broker has advanced knowledge of pending orders for a security, which can reliably predict a change in the price for the security. If there are many pending buy orders, the price of the security is likely to increase. If there are many pending sell orders, the price of the security is likely to decrease. If the broker purchases the security ahead of the orders, the broker gains an unfair advantage to the detriment of the clients of the broker and the market for the security. Front running is illegal either as fraud based on a broker placing the broker's interest ahead of that of the clients or as breaking other rules and regulations of exchanges or the overseeing bodies.

Manipulative trading involves the situation in which a broker or other entity attempts to affect the settlement price of a contract at the end of the day thereby making some trades earlier more profitable relative to the settlement price. Contract skimming occurs when a broker trades for many customers but systematically allocates the most favorable portion of like trades to a preferred account. Often, the preferred account is the account of the broker or a de facto associate. The preferred account is an account that may be identified as too consistently profitable.

Money passing may be referred to as non-economic trading. In another sense, non-economic trading includes any trading not performed for fair market economic reasons. Fair market economic reasons typically include investment, anticipation of changes in value and hedging. Non-economic trading may involve money passing or the transfer of assets through an Exchange to avoid the tax implications, regulations, or surveillance that would normally be associated with such a transfer. For example, a direct transfer of funds from a domestic bank to an offshore bank may trigger investigation into money laundering. However, smaller daily transfers facilitated through the Exchange may accomplish nearly the same effect without raising suspicion. Non-economic trading may also involve tax evasion. Showing losses in one tax jurisdiction and gains in another tax jurisdiction may be used to avoid paying taxes or pay fewer taxes to the deserving jurisdiction. Many exchanges and regulatory bodies have prohibition against such "pre-arranged trades" or "tax-switch transactions."

The following embodiments may be applied to any financial instrument or security in the context of day trading or in the context of positions that are held for more than one day. Securities include, but are not limited to, stocks, options, futures contracts, and swaps. Investigation into accounts that are too consistently profitable or too lossy may be more prevalent in day trading because the fruits of the schemes discussed above may evaporate into the fluctuating market price if the market participant buys and holds the security.

An electronic surveillance system determines when an account's day trades are too consistently profitable or too consistently unprofitable (lossy). The electronic surveillance system examines specific futures commodities or other securities over a specified time period (e.g., daily, hourly, weekly, or monthly). In one implementation the specified time period is daily and the electronic surveillance system detects whether the account profits or loses almost every day. Additionally, the electronic surveillance system may determine, among the accounts that are too consistent, those that gain or lose too much money per contract.

The electronic surveillance system may investigate all securities over all market participants and all possible time periods. Alternatively, the user may specify a specific futures commodity or security and/or a specific time period. In order to find those the accounts that gain or lose too much money per contract, the process must be computed for one commodity at a time. The profitability or unprofitability of the contracts may be compared to day trades in the particular commodity. The user may also specify a minimum percentage of the trading sessions that are profitable or lossy. For example, the user may query all accounts with day trades in CL Crude Oil from Sep. 1, 2009 through Mar. 12, 2010 that profited or lost on 90% or more of the days in which they day-traded, and gained $500 or more (or lost $500 or more) per contract during the time interval and with at least 20 active days.

The results of the query are displayed graphically so that patterns emerge. For example, long streaks of profitable or lossy days are more easily discernible using symbols than a column of numbers. One symbol may be used for profitable days and another symbol for lossy days. Similar or complementary streaks suggest connections among seemingly unrelated trading accounts.

The electronic surveillance system focuses on day trading round turns. A round turn occurs when an account buys and sells the security on the same day. The number of round turns traded by an account in one day in a contract is the minimum of the number of contracts bought and the number of contracts sold, as shown by Equation 1. The number of round turns and profit per contract is computed separately for each type of contract traded.

Round Turns=minimum(contracts bought,contracts sold)  (Equation 1)

The account's one day gain for any one security may be calculated by first computing the daily weighted average price across all of the trades on the buy side in the account and the daily weighted average price across all of the trades on the sell side in the account. In other words, the prices of all contracts of each of the selected securities sold are averaged and the prices of all contracts of each of the selected securities bought are averaged.

It should be noted that the number of round turns does not impact the averaging process. For example, if 80 contracts of CL2009B are bought in one day and 90 contracts of CL2009B are sold in the same day, the number of round turns is 80 and the number of contracts used to calculate the daily weighted average price across all of the trades on the buy side is also 80. However, the number of contracts used to calculate the daily weighted average price across all of the trades on the sell side is 90. The number of round turns does not impact the weighted average calculation.

The account's one day gain for one contract of the security may be calculated by subtracting the daily weighted average price across all of the trades on the buy side in the account from the daily weighted average price across all of the trades on the sell side in the account. Conversely, for unprofitable days, the account's one day loss for the security may be calculated by subtracting the daily weighted average price across all of the trades on the sell side in the account and the daily weighted average price across all of the trades on the buy side in the account. The account's total one day gain or one day loss is multiplied by the number of round turns and the quantity, as shown in Equation 2. It should be noted that Equation 2 may be used to compute a negative daily gain, which is a daily loss.

Daily Gain=(ave sell price−ave buy price)(round turns)(contract size)  (Equation 2)

The contract size represents the number of contracts of the specific futures contracts or other applicable value. In the case of futures contracts, the contract size may be determined by commodity. In the case of shares of stock and Equations 2, contract size would be set equal to one because the number of shares is the number of round turns (i.e., contract size is not applicable to stocks.)

In one alternative, the electronic surveillance system may consider only round turns between a pair of market participants. That is, the trading data is filtered or organized to include transactions between each pair of market participants to identify pairs of accounts that are unusually profitable or lossy when trading opposite one another and tend to involve the flow of money in one direction, consistently from one of the pair members to another of the pair members. The electronic surveillance system may also identify an unusually large profit or loss per contract.

The electronic surveillance system may focus on accounts which gained or lost unusually large amounts on the average per contract traded or for the total time period and filter the accounts to display to the user the accounts that may warrant further investigation. The information may be displayed in an intuitive way, such that interesting accounts "jump off" the page or the screen at the user.

Figure 1:
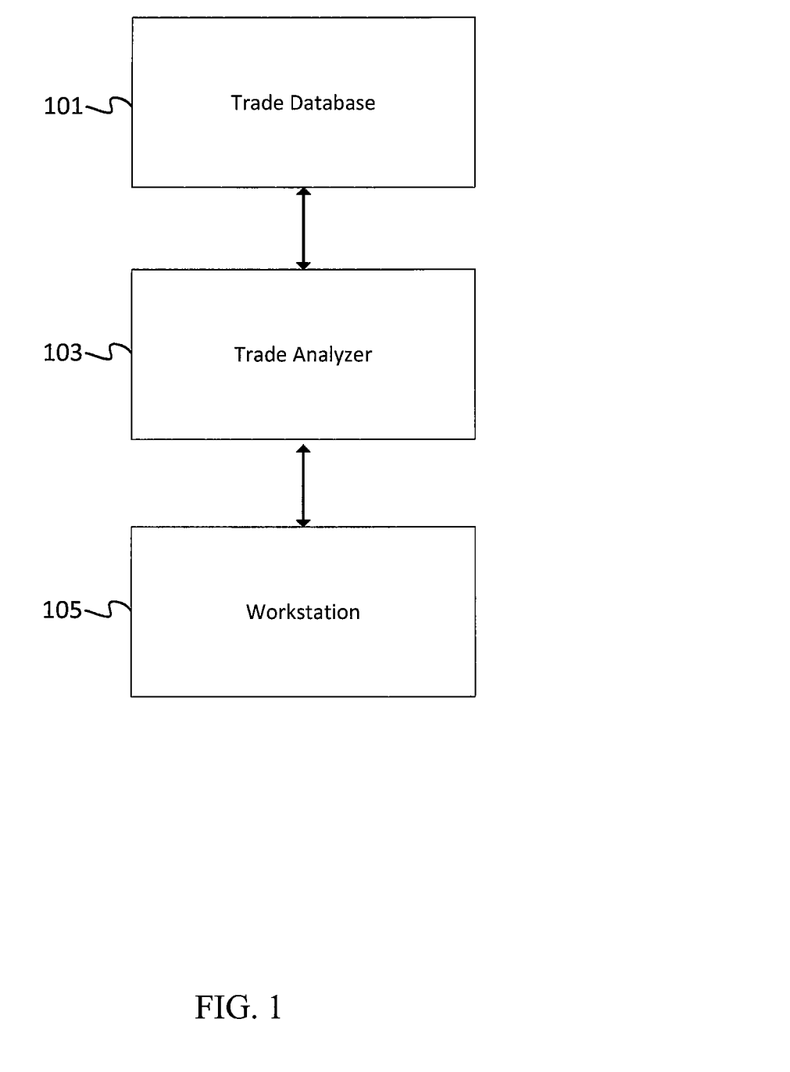
FIG. 1 illustrates an example of an electronic surveillance system for the identification of unusually consistent trading activities.

FIG. 1 illustrates an example of an electronic surveillance system for the identification of unusually consistently profitable or unusually consistently lossy trading activities. The electronic surveillance system includes a trade database 101, a trade analyzer 103, and a reporting device or workstation 105. Additional or fewer components may be provided.

The trade database 101 includes trading data for a plurality of trading accounts over a plurality of time periods. The trading data may include information on one or more equity securities. The equity securities may be stocks, bonds, or derivative contracts. Derivative contracts include, but are not limited to futures contracts, options, swaps, and forwards. In one form, the trading data may be straightforward buy-sell data that describes every transaction made by the plurality of trading accounts. In one form, the trading data includes more detailed information such as how many of each security were bought and how many of each security were sold during each of a set of selected time periods.

The trade analyzer 103 may be embodied on a computer, a server, or a similar device as discussed below. In one embodiment the trade analyzer 103 and workstation 105 may be combined in a single device. The trade analyzer 103 accesses the trading data from the trade database 101. The trading data may include data associated with as few as two market participants to as many as thousands or millions of market participants.

The trade analyzer 103 receives trading data for a plurality of trading accounts over a plurality of time periods and determines a number of the plurality of bought contracts and a number of the plurality of sold contracts for at least one of the plurality of trading accounts. The trade analyzer 103 determines the number of round turns for each security or contract using Equation 1. The trade analyzer 103 calculates a net difference of an average price of the plurality of bought contracts and an average price of the plurality of sold contracts and calculates the daily gain or daily loss in each account for each security or contract using Equation 2A or Equation 3A.

Round Turns=minimum(contracts bought,contracts sold)  (Equation 1)

Gain/Loss=(net difference)(round turns)(contract size)  (Equation 2A)

The trade analyzer 103 identifies the specific time period or periods and calculates the number of time periods for which each account has a gain and the number of time periods for which each account has a loss. Calculating the number of time periods may involve incrementing a loss count if the net difference is below a minimum loss threshold and incrementing a profit count if the net difference is above a minimum profit threshold.

The trade analyzer 103 may receive an input from a user that identifies the minimum percentage of the trading sessions for an account that are profitable or lossy before the account should be considered too consistently profitable or too consistently lossy. This minimum percentage may be referred to as the minimum profit percentage or the minimum loss percentage. The minimum profit percentage and the minimum loss percentage may be the same value. Example values include 70%, 80%, 85%, and 90%. Alternatively, the minimum profit percentage and the minimum loss percentage may be different values. For example, the values may be based on the characteristics of the market for the particular security, the size of the contract, or other factors that can be measured, and an effective value for the minimum percentage is determined over time.

The trade analyzer 103 is configured to add the loss count and the profit count to determine the total trading days that the account participating in the market for the particular security. The trade analyzer 103 compares the profit count divided by the total trading days to the minimum profit percentage or compares the loss count divided by the total trading days. If the quotient exceeds the minimum percentage in either case, the trade analyzer 103 may determine that the account has an "interesting" profit pattern and may have participated in non-economic or otherwise mischievous trading.

Accordingly, the trade analyzer 103 may generate a signal or report indicative of unusually-consistent trading, which is transmitted to the workstation 105. In other words, the trade analyzer 103 outputs an indication of unusual trading if the profit count divided by the total trading days exceeds a minimum profit percentage for the plurality of time periods or the loss count divided by the total trading days exceeds a minimum loss percentage for the plurality of time periods. The work station 105 may display, print, or otherwise convey this information in the form of a report, which may include a matrix of trader performance.

Figure 2:
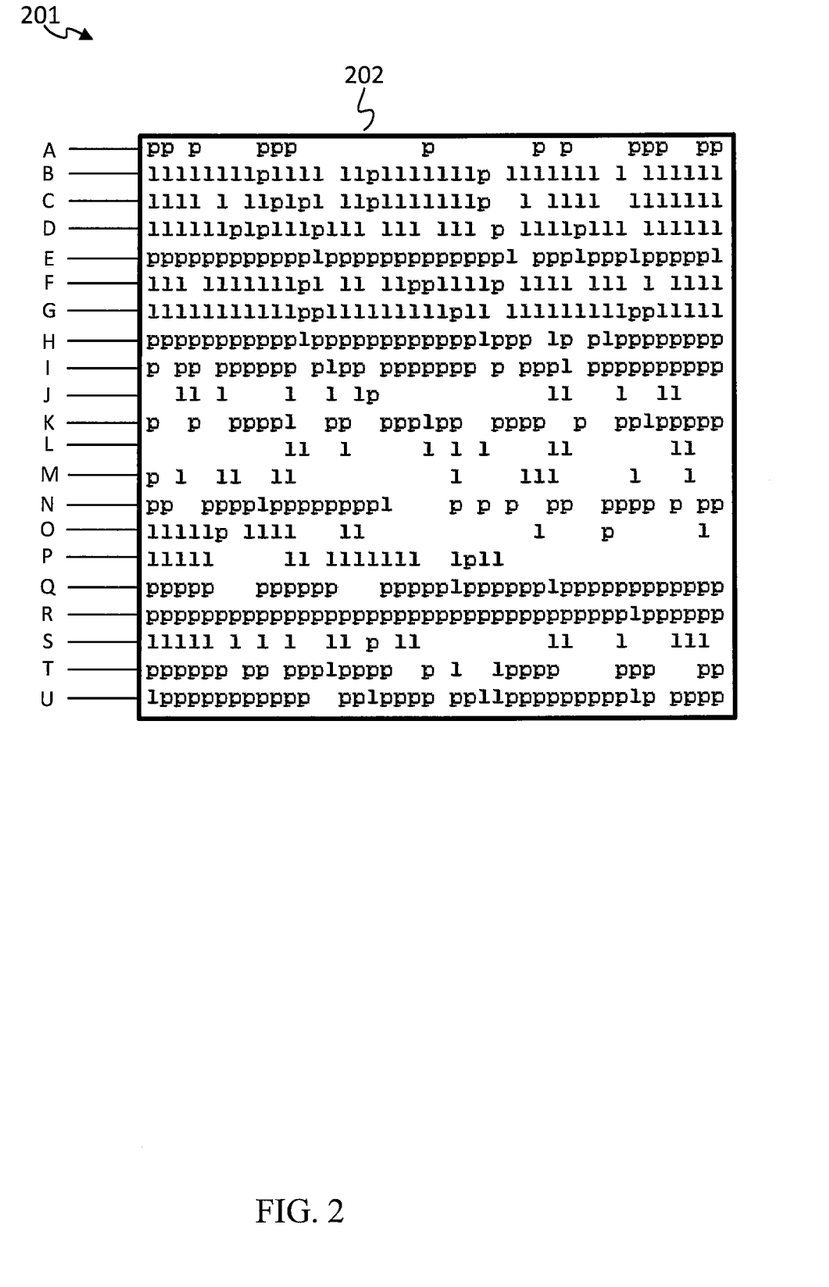
FIG. 2 illustrates an example of a matrix of trader performance.

FIG. 2 illustrates an example of a matrix 202 of trader performance. The matrix 202 is part of an anomaly report 201, which generated by work station 105 or trade analyzer 103. The matrix 202 includes an alphanumerical indicator for each account for each time period under examination. For example, the alphanumerical indicator "p" may indicate a profitable day and the alphanumerical indicator "l" may indicate a lossy time period. Each account is indexed by a trader identification value, which is illustrated in FIG. 2 as letters A through U.

The human eye naturally identifies long sequences of p's and l's and so the accounts with long stretches of profitable or lossy time periods seem to jump out at the observer. To increase this effect, days where no account in the matrix 202 participated in the market for the security may be removed from the matrix 202. In addition, on an account by account basis, days where an account in the matrix 202 did not participate in the market for the security may be removed for that accounts entry in the matrix 202. The system is configured to display one or both representations according to a user input. That is, the user may select one matrix for an account which shows every day with the non-trading days blank or a matrix for the account which does not show non-trading days so as to highlight the trading pattern relative to the calendar and to illustrate similarities among several accounts or both.

Figure 3:
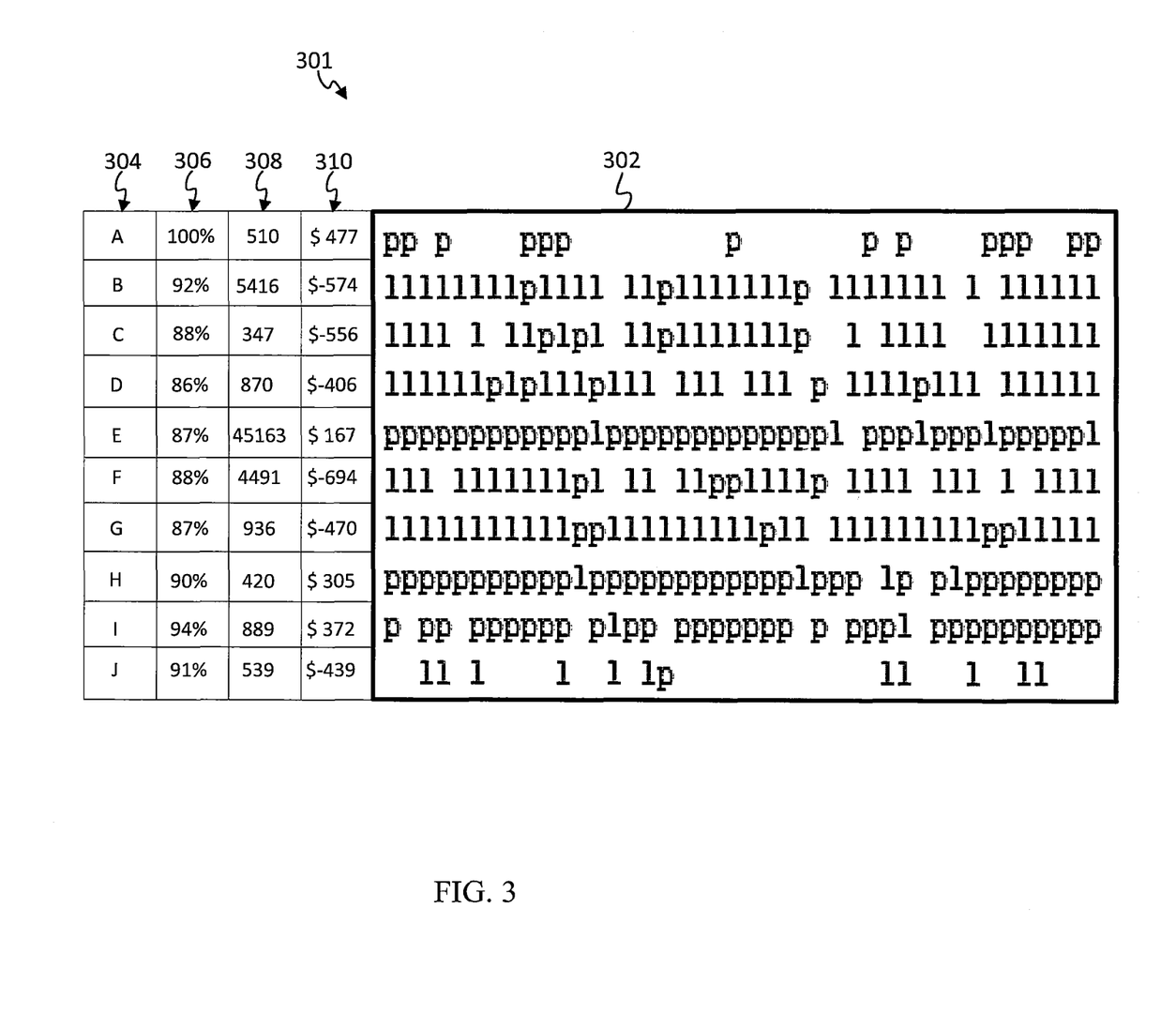
FIG. 3 illustrates another example of a matrix of trader performance including statistical information.

FIG. 3 illustrates another example of a matrix 302 of trader performance including statistical information as anomaly report 301. The statistical information includes trader identification data 304, profit/loss percentage data 306, contract volume data 308, and profit/loss per contract data 308.

The trader identification data 304 includes an account identifier for each account in the anomaly report 301. The profit/loss percentage data 306 indicates for what account what percent of trading time periods, or alternatively, what percentage of total time periods was either of profitable or lossy, depending on whether the account was more profitable or lossy on average. The contract volume data 308 indicates the number of contracts in the round turns for trading account summer over the trading periods. The profit/loss per contract data 310 indicates the amount gained or loss on average over all of the trading periods for the specific contract. The relative magnitude of the profit/loss per contract data indicates whether the account activity is likely out of the ordinary.

Figure 4:
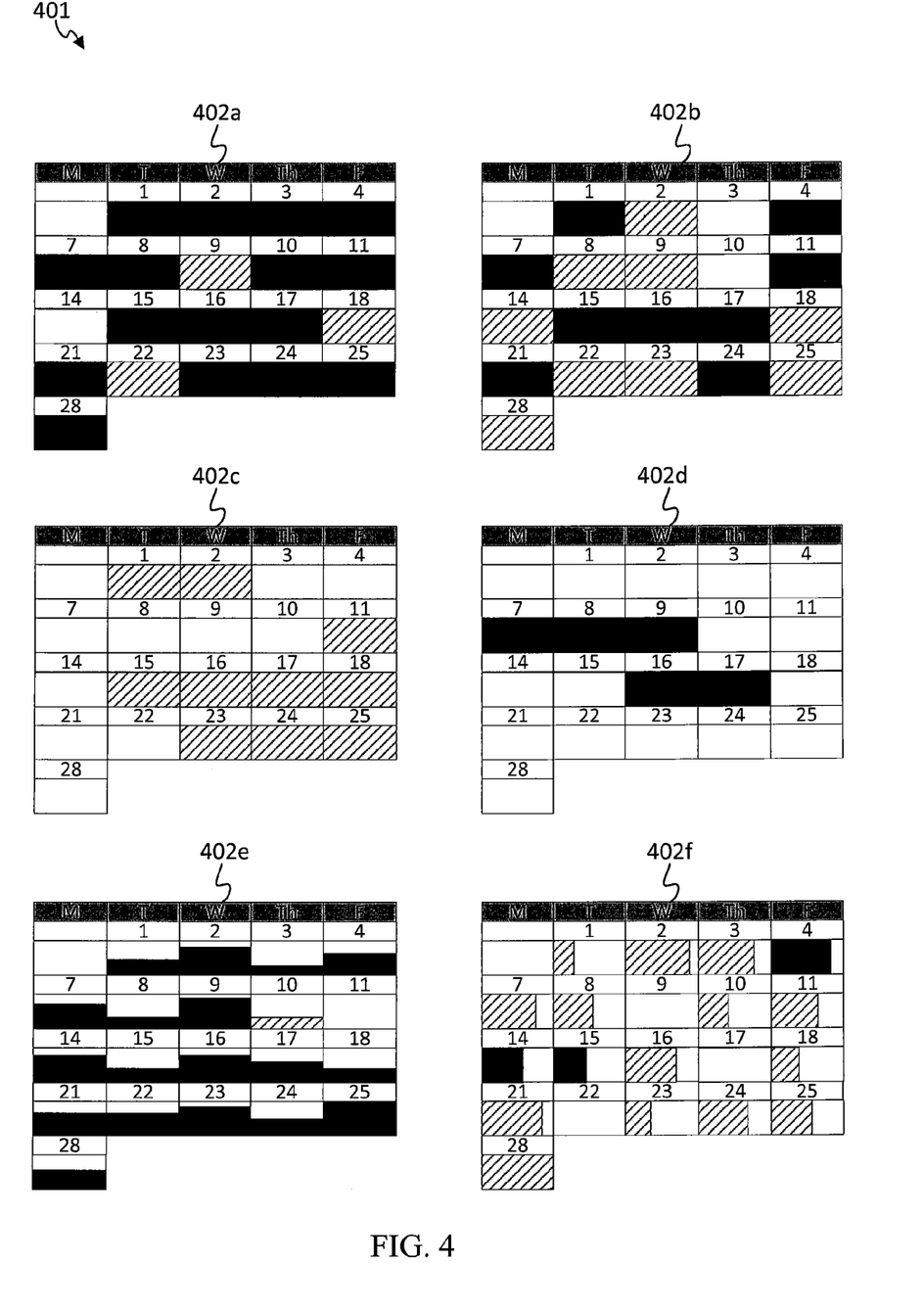
FIG. 4 illustrates an example of a matrix of trader performance using calendars.

FIG. 4 illustrates an example of a matrix 401 of trader performance using a calendar for each account. The matrix 401 includes calendars 402a-f for six accounts. The calendars provide a graphical representation of the number of days each accounts was profitable or lossy. In one implementation, the dark shading represents profitable days, the hashed shading represents lossy days, and no shading represents days where the account did not trade in the particular security. The graphical representation allows an observer to determine quickly rather the account is too consistently profitable or too consistently lossy.

Each of calendars 402a-f illustrates an example month of trading data including 20 trading days. The calendar 402a illustrates a trading account 16 profitable days and 3 lossy days, which will be considered too consistently profitable trading activity by the trade analyzer 103 if 84.2% exceeds the minimum profit percentage. The calendar 402b illustrates 9 profitable days and 9 lossy days. The trade analyzer 103 will not consider the trading activity illustrated by calendar 402b to be unusual.

The calendar 402c illustrates no profitable days and 10 lossy days. The trade analyzer 103 will consider the trading activity illustrated by calendar 402c to be too consistently lossy for any minimum loss percentage because all trading days were lossy. However, the account associated with calendar 402 traded only during 10 of the days, and may be excluded from analysis as a relatively inactive account. Likewise, the calendar 402d illustrates 5 profitable days and no lossy days. The account associated with calendar 402d was profitable 100% of the time but participated only 25% of the time.

The calendar 402e illustrates 18 profitable days and 1 lossy day. The trade analyzer 103 considers the account associated with calendar 402e as too profitable as long as the minimum profit percentage set by the user or determined by market history is below approximately 94.7%. The calendar 402e also incorporates a vertical bar graph on a time period by time period basis to show graphically the average gain or loss per share or contract. The calendar 402f illustrates 14 lossy days, and 3 profitable days. The trade analyzer 103 considers the account associated with calendar 402f as too lossy as long as the minimum loss percentage is below approximately 80%. The calendar 402f also incorporates a horizontal bar graph to illustrate graphically the relative gain or loss per share or contract. Other types of graphical representations may be generated by the trade analyzer 103 or workstation 105.

Figure 5:
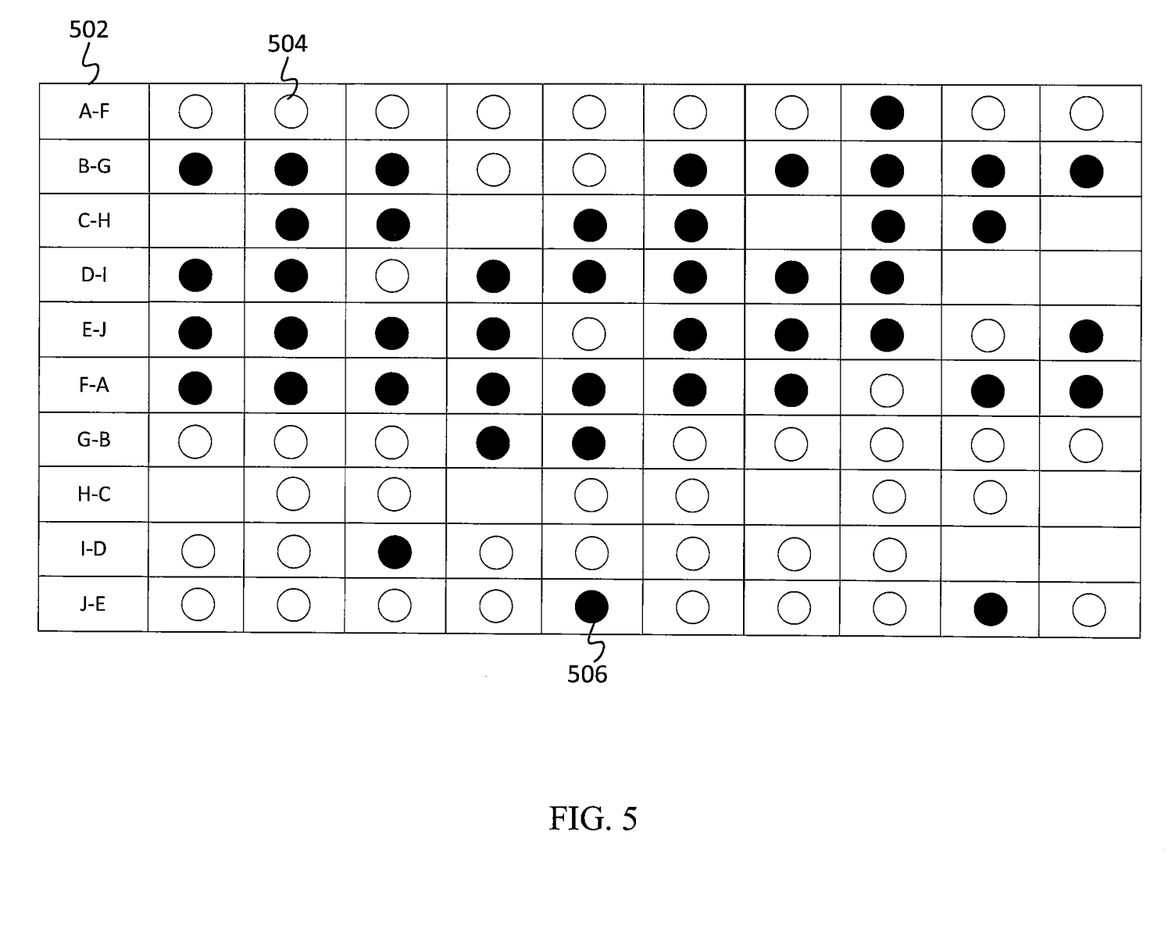
FIG. 5 illustrates another example of a matrix of pairs of trader performance.

FIG. 5 illustrates another example of a matrix of 502 trader performance. In this example, pairs 502 of trading accounts are identified by the trade analyzer 103. Lossy time periods are illustrated with an open circle 504, and profitable time periods are illustrated with a darkened circle 506. It should be noted that in the example shown in FIG. 5, each pair of trading accounts includes an opposite pair of trading accounts. The opposite pair of trading accounts shows the opposite (gain/loss) for each trading period, and the row of gain and loss indicates are arranged as a mirror image of the first pair of trading accounts. Analyzing the trading data in pairs of trading account may better reveal the collusion involved in pre-arranged trades, tax shifting, or other schemes.

Figure 6:
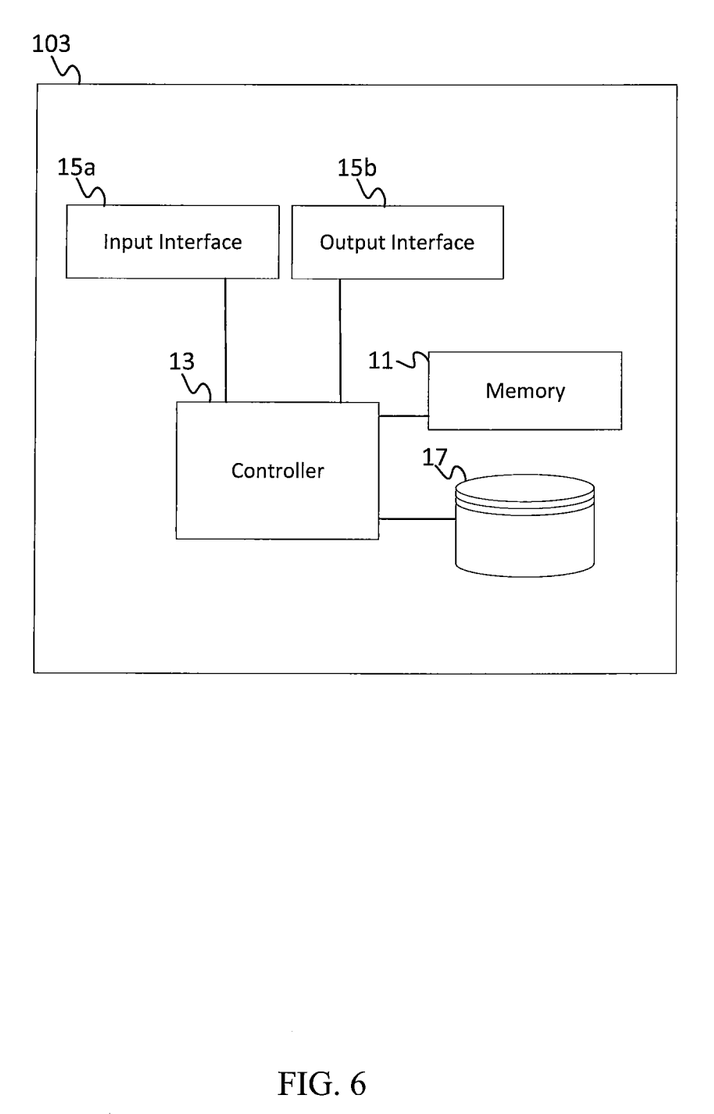
FIG. 6 illustrates a more detailed view of the trade analyzer of the electronic surveillance system of FIG. 1.

FIG. 6 illustrates the trade analyzer 103 for the system for market surveillance of FIG. 1. The trade analyzer includes a communication interface 15, a controller 13, a memory 11, and a database 17. The trade database 101 may be integrated, or incrementally loaded into, the memory 11 or database 17.

The communication interface 15 may include an input communication interface 15a and an output communication interface 15b. The communication interface 15 is configured to establish connectivity with the trade database 101 and the workstation 105. The communication interface may also establish communication with a network (not shown) such as the internet. The controller 13 receiving trading data internally from memory 11 or database 17 or externally if the trade database 101 is external to the trade analyzer 103.

The trading data may be limited to a single account or include some or all accounts available. The accounts may be associated with an Exchange or electronic trading service. The trading data may be organized by transaction. Each transaction may include the account identifier of the buyer, the account identifier of the seller, the price of the trade, the quantity of the trade, and a time stamp. The trading data may be sorted and/or filtered before it is received at the trade analyzer 103 or, alternatively, the controller 13 may be configured to sort or filter the trading data. The trading data may be sorted into pairs of market participants so that the trading data is analyzed separately for each pair of market participants that have traded opposite to one another. The trading data may be filtered by a predetermined list of account identifiers. The trading data may be filtered by transaction above a threshold price or a threshold quantity.

The controller 13 processes the trading data to determine how many of the security was purchased and how many of the security was sold by the trading account. The controller 13 calculates the average buying price and the average selling price. If the net difference of the average buying price subtracted from the average selling price is positive, the account has suffered a gain for the current time period. If the net difference of the average buying price subtracted from the average selling price is negative, the account has suffered a loss for the current time period.

The controller 13 generates and maintains a loss count and a profit count, which may a number stored in memory 11. The loss count and profit count may be independent quantities. The controller 13 increments the profit count if the net difference of the average buying price subtracted from the average selling price is positive and increments the loss count if the net difference of the average buying price subtracted from the average selling price is negative. Alternatively, the count could be implemented as a single number that becomes more negative for consistently lossy accounts or more positive for consistently profitable accounts.

The memory 11 may also be stored a threshold for the percentage of time periods that are profitable or lossy to reasonably indicate that unusual trading is taking place in the account. The threshold may be entered by a user. The threshold may be determined on a security by security basis and may depend on the particular characteristics of the market. The threshold may comprise separate values for profitable accounts and lossy accounts. For example, the threshold may comprise a minimum profit percentage and a minimum loss percentage.

The controller 13 may calculate what percentage of the time periods are profitable and/or what percentage of the time periods are lossy. For example, the controller 13 may add the loss count and the profit count to determine the total number of trading time periods. The controller 13 may calculate what percentage of the time periods included profitable time periods by dividing the profit count by the total number of trading periods. The controller 13 may calculate what percentage of the time periods included lossy time periods by dividing the loss count by the total number of trading periods. The controller 13 compares the result to the appropriate minimum percentage.

If the controller 13 determines that the percentage of time periods that are profitable (or lossy) exceeds the minimum percentage, the controller 13 outputs an indication of unusual trading. For example, the controller 13 may generate any of the anomaly reports discussed above.

The controller 13 may calculate additional information for the anomaly report. For example, the change per contract, which corresponds to the amount lost on average by contract or the amount gained on average by contract may calculated by multiplying the net difference by the lesser of the number of the plurality of bought contracts and a number of the plurality of sold contracts.

The controller 13 may calculate a day trading ratio for each of the trading accounts for each time period. The trading data may include both day trading transactions that are bought and sold in a same day and overnight transactions that are bought and sold on different days. The controller 13 computes a day trading ratio for each of the plurality of trading accounts. The day trading ratio may be a volume of day trading transactions divided by a volume of bought transactions or sold transactions, whichever is higher or a value of day trading transaction to a value of total transactions. Alternatively, the day trading ratio may be the volume of day trading transactions divided by the total volume of transactions or the value of day trading transactions divided by the total value of all transactions. The day trading ratio may be included on the anomaly report. In another implementation, the day trading ratio may be used using round turns. As shown in Equation 1, the number of round turns is the lesser of the number of contracts or securities bought and the number of contracts or securities sold. Related to this quantity is the number of contracts or securities sold or bought. The day trading ratio can be computed, using Equation 3, as the ratio of the round turns to the number of contracts bought or the number of contracts sold, whichever is higher.

$$\text{Round Turns} = \text{minimum}(\text{contracts bought, contracts sold}) \quad \text{(Equation 1)}$$

$$\text{Day Trading Ratio} = \frac{\text{Round Turns}}{\text{maximum}(\text{contracts bought, contracts sold})} \quad \text{(Equation 3)}$$

A pure day-trader has a day trading ratio of 1.000, and a pure hedger or long-term speculator has a day trading ratio of 0.000. The controller may filter the trading data according to the day trade ratio using minimum values or maximum values such as 0.5000, 0.8000, 0.1000 or another value. The user may specify the minimum or maximum value using workstation 105.

The controller 13 may make determine whether each account is active enough to be included in the anomaly report. The determination may be done before the profit and loss calculation so that the relatively inactive accounts are excluded from the calculations. The controller 13 may compare the number of trading periods that each account was active at all to a minimum number of trading period's value. Alternatively, the controller 13 may compare the number of trading periods that each account included at least one round turn or had a day trading ratio greater than 0.000. The minimum number of trading periods may also be expressed as a percentage of the total number of trading periods. The user may provide the minimum number of trading periods by way of workstation 105. Example values for the minimum number of trading periods may be 10, 20, or 50.

The memory 11 may be any known type of volatile memory or a non-volatile memory. The memory 11 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory.

The memory 11 may store computer executable instructions for the algorithms discussed herein. The controller 13 may execute the computer executable instructions. The computer executable instructions may be included in computer code. The computer code may be stored in the memory 11. The computer code may be written in any computer language which is suited for associative arrays and/or hash tables, such as C, C++, C#, Java, Pascal, Visual Basic, Perl, Python, or another language. Additionally, Javascript, HTML or XML may be utilized for the interface and display along with another language for the other algorithms. The computer code is encoded in one or more tangible media or one or more non-transitory tangible media for execution by the controller 13.

The instructions may be stored on any computer readable medium. The computer readable medium may be non-transitory. The computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 13 may include a general processor, digital signal processor, application specific integrated circuit, field programmable gate array, analog circuit, digital circuit, server processor, combinations thereof, or other now known or later developed processor. The controller 13 may be a single device or combinations of devices, such as associated with a network or distributed processing. Any of various processing strategies may be used, such as multi-processing, multi-tasking, parallel processing, remote processing, centralized processing or the like. The controller 13 may be responsive to or operable to execute instructions stored as part of software, hardware, integrated circuits, firmware, micro-code or the like. The functions, acts, methods or tasks illustrated in the figures or described herein may be performed by the controller 13 executing instructions stored in the memory 11. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The communication interface 15 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. For example, a first communication interface 15b devoted to sending data, packets, or datagrams and a second communication interface 15a devoted to receiving data, packets, or datagrams. As used herein, the phrases "communication" and "coupled" are defined to mean directly connected to or indirectly connected through one or more intermediate components. Such intermediate components may include both hardware and software based components.

Figure 7:
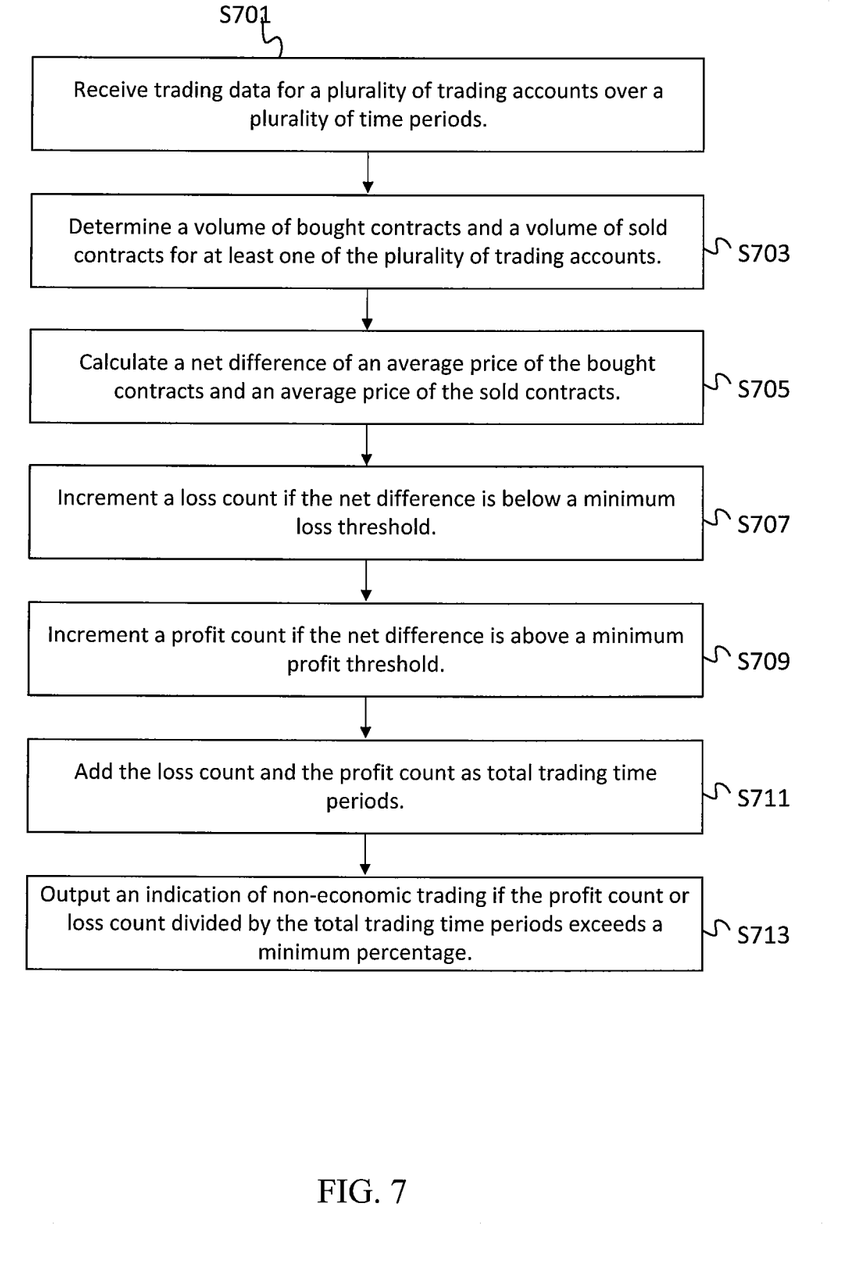
FIG. 7 illustrates an example algorithm for identifying unusually consistent trading activities.

FIG. 7 illustrates an example algorithm for identifying too consistently profitable or too consistently lossy trading activities. At act S701, the trade analyzer 103 receives trading data for a plurality of trading accounts over a plurality of time periods. The trading data may be received from local memory or from an external database. The trading data may be raw data which is sorted and filtered by the trade analyzer 103. The traded data may be sorted into pairs such that every market participant is matched with every other market participant and the transactions for that pair of market participants are listed.

At act S703, the value of bought contracts and the value of sold contracts associated with a particular account is determined. At act S705, the trade analyzer 103 calculates a net difference by subtracting an average price of the bought contracts from an average price of the sold contracts. When the net difference is positive, the trading account has profited for the current trading period. When the net difference is negative, the trading account has not profited for the current trading period.

At act S707, the trade analyzer 103 counts the loss as a loss count if the net difference is below a minimum loss threshold. The minimum loss threshold may be a value set by the user of the amount of loss required to consider the time period lossy. At act S709, the trade analyzer 103 counts the profit as a gain count if the net difference is above a minimum profit threshold. The minimum profit threshold may be a value set by the user of the amount of profit required to consider the time period profitable. The trade analyzer increments the loss count and the profit account as the analysis proceeds in additional time periods.

At act S711, the trade analyzer 103 calculates the total number of trading time periods by summing the loss count and the profit count. Alternatively, the number of trading time periods may be calculated in another manner or included directly in the trading data. At act S713, the trade analyzer 103 outputs a signal or other indication of unusual trading when the trading account has been profitable in too many days during the time periods considered. For example, the trading account may be considered too profitable when the profit count or loss count divided by the total trading time periods exceeds a minimum percentage.

The minimum percentage may be entered through user input via the workstation 105. Alternatively, the trade analyzer 103 may calculate the minimum percentage through a statistical analysis. For example, the trade analyzer may calculate a mean profit and a mean loss per contract or share and a mean profit standard deviation and a mean loss standard deviation. For each trading account and for each trading period, the trade analyzer may calculate how many standard deviations from the mean of all market participants, the trading account performed on each trading time period. If the trading account under analysis is above the mean by a threshold number of profit standard deviations, the trade analyzer 103 may consider the trading account too profitable. If the trading account under analysis is below the mean by a threshold number of loss standard deviations, the trade analyzer 103 may consider the trading account too lossy. Example threshold number of profit or loss standard deviations may be 5, 10, 20, or another value.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Regulated and unregulated exchanges and other electronic trading services make use of electronic trading systems. For example, the following embodiments are applicable to any trading or futures market in the United States or elsewhere in the world, for example, the Chicago Board of Trade (CBOT), the Chicago Mercantile Exchange (CME), the Bolsa de Mercadorias e Futoros in Brazil (BMF), the London International Financial Futures Exchange, the New York Mercantile Exchange (NYMEX), the Kansas City Board of Trade (KCBT), MATIF (in Paris, France), the London Metal Exchange (LME), the Tokyo International Financial Futures Exchange, the Tokyo Commodity Exchange for Industry (TOCOM), the Meff Renta Variable (in Spain), the Dubai Mercantile Exchange (DME), and the Intercontinental Exchange (ICE).

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer implemented method of detecting unusually consistent profitable or lossy trading, the method comprising:
   receiving, at a processor, trading data for a plurality of trading accounts over a plurality of time periods, wherein the trading data includes a plurality of bought contracts and a plurality of sold contracts;
   determining, by the processor, a number of the plurality of bought contracts and a number of the plurality of sold contracts for at least one of the plurality of trading accounts;
   calculating, by the processor, a net difference of an average price of the plurality of bought contracts and an average price of the plurality of sold contracts;
   incrementing, by the processor, a loss count if the net difference is below a minimum loss threshold;
   incrementing, by the processor, a profit count if the net difference is above a minimum profit threshold;
   adding, by the processor, the loss count and the profit count as total trading time periods; and
   outputting, by the processor, an indication of unusually consistent profitable or lossy trading if the profit count divided by the total trading time periods exceeds a minimum profit percentage for the plurality of time periods or the loss count divided by the total trading time periods exceeds a minimum loss percentage for the plurality of time periods.

2. The computer implemented method of claim 1, further comprising: multiplying, by the processor, the net difference by a lesser of the number of the plurality of bought contracts and a number of the plurality of sold contracts to calculate a profit or loss per contract; and displaying the profit or loss per contract.

3. The computer implemented method of claim 1, further comprising: receiving, at the processor, a minimum percentage from a user input, wherein the minimum profit percentage equals the minimum percentage and the minimum loss percentage equals the minimum percentage.

4. The computer implemented method of claim 1, wherein the trading data includes day trading transactions that are bought and sold in a same day and other transactions that are bought and sold on different days.

5. The computer implemented method of claim 1, further comprising: computing, by the processor, a day trading ratio for each of the plurality of trading accounts, wherein the day trading ratio relates a volume of day trading transactions to a higher of a volume of buying transactions or a volume of selling transactions or relates a value of day trading transaction to a value of total transactions.

6. The computer implemented method of claim 1, further comprising: generating, by the processor, a graphical representation of the indication of unusually consistently profitable or lossy trading including a relative magnitude of the profit count and the loss count.

7. The computer implemented method of claim 6, wherein the graphical representation comprises a matrix of the time periods.

8. The computer implemented method of claim 7, wherein the matrix of the time periods omits at least one time period in which no contracts were bought or sold by the one of the plurality of trading accounts.

9. An electronic surveillance system comprising:
a trade database storing trading data for a plurality of trading accounts over a plurality of days, wherein the trading data includes a plurality of bought securities and a plurality of sold securities;
a controller configured to calculate a net difference of an average price of purchased securities an average price of sold securities for each of the plurality of days and increment a profit count for each day that the net difference is positive and a loss count for each day that the net difference is negative; and
a reporting device configured to output an indication of unusually consistent trading if the profit count or the loss count reaches a minimum percentage of a number of the plurality of days.

10. The electronic surveillance system of claim 9, wherein the controller is configured to calculate a change per contract through multiplying the net difference by a lesser of a number of the plurality of bought securities and a number of the plurality of sold securities.

11. The electronic surveillance system of claim 9, further comprising: an input device configured to receive a user input indicative of the minimum percentage.

12. The electronic surveillance system of claim 9, wherein the trading data includes day trading transactions that are bought and sold in a same day and other transactions that are bought and sold on different days.

13. The electronic surveillance system of claim 9, wherein the controller is configured to compute a day trading ratio for each of the plurality of trading accounts, wherein the day trading ratio relates a volume of day trading transactions to a volume of total bought transactions or total sold transactions or a value of day trading transactions to a value of total transactions.

14. The electronic surveillance system of claim 9, wherein the reporting device is further configured to generate a graphical representation of the indication of unusually consistent trading including a relative magnitude of the profit count and the loss count.

15. The electronic surveillance system of claim 14, wherein the graphical representation comprises a matrix of the time periods.

16. A non-transitory computer readable medium containing instructions that when executed perform a method comprising:
receiving trading data for a plurality of trading accounts over a plurality of time periods, wherein the plurality of trading accounts are organized in pairs for every two trading accounts that participated in one or more transaction;
determining a number of bought securities and a number of sold securities for each of the pairs of trading accounts;
subtracting an average price of the bought securities from an average price of the sold securities as a net difference;
incrementing a loss count if the net difference is negative;
incrementing a profit count if the net difference is positive; and
displaying an anomaly report if the profit count or the loss count reaches a predefined percentage of a quantity of the plurality of time periods.

17. The non-transitory computer readable medium of claim 16, the method further comprising: multiplying the net difference by a lesser of the number of bought securities and the number of sold securities to calculate a change per contract; and displaying the change per contract as part of the anomaly report.

18. The non-transitory computer readable medium of claim 16, the method further comprising: computing a day trading ratio for each of the plurality of trading accounts, wherein the day trading ratio relates a volume of day trading transactions to other transactions.

19. The non-transitory computer readable medium of claim 16, the method further comprising: generating a graphical representation of the anomaly report including a relative magnitude of the profit count and the loss count.

20. The non-transitory computer readable medium of claim 16, wherein the graphical representation comprises a matrix of the time periods.

* * * * *